F. O. JAQUES, Jr.
MEANS FOR MAKING CASTELLATED NUTS.
APPLICATION FILED JULY 28, 1919.

1,414,417. Patented May 2, 1922.

INVENTOR:
Fernando Oscar Jaques, Jr.,
By Chas. H. Luther
ATTORNEY.

UNITED STATES PATENT OFFICE.

FERNANDO OSCAR JAQUES, JR., OF PROVIDENCE, RHODE ISLAND, ASSIGNOR OF ONE-HALF TO HAROLD CALDWELL PECKHAM, OF CRANSTON, RHODE ISLAND.

MEANS FOR MAKING CASTELLATED NUTS.

1,414,417.   Specification of Letters Patent.   Patented May 2, 1922.

Original application filed February 28, 1919, Serial No. 279,742. Divided and this application filed July 28, 1919. Serial No. 313,800.

*To all whom it may concern:*

Be it known that I, FERNANDO OSCAR JAQUES, Jr., a citizen of the United States, residing at Providence, in the county of Providence and State of Rhode Island, have invented a new and useful Improvement in Means for Making Castellated Nuts, of which the following is a specification.

This application is a divisional application, divided from my application for a Patent No. 1,314,668 on means for making castellated nuts, filed February 28, 1919, Serial No. 279,742, division required June 21, 1918, and has for its object all of the objects given in said application.

My invention consists in the peculiar and novel construction and operation of means for making castellated nuts, as will be more fully set forth hereinafter and claimed.

Figure 1:
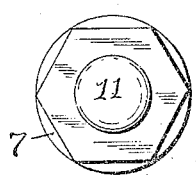
Figure 1 is an end view of the plunger member.

In the drawings 7 indicates a plunger member, 8 a nut holding and castellating member, 9 a nut blank and 10 a castellated nut.

Figure 3:
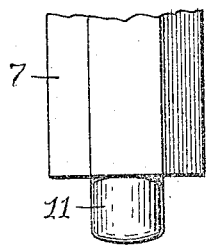
Figure 3 is a side view of the plunger member and a sectional view of the nut holding and castellating member, showing the members separated and a nut blank in position to be castellated.

The plunger member 7 is hexagonal in form, it has a sliding fit in the member 8, and a round central hole forming stud 11 which protrudes from the end of the plunger, as shown in Figure 3.

Figure 2:
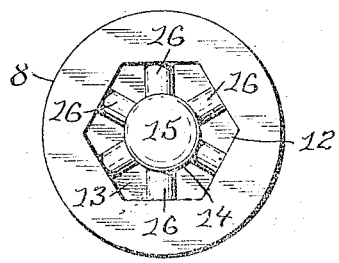
Figure 2 is an end view of the nut holding and castellating member.
Figure 4:
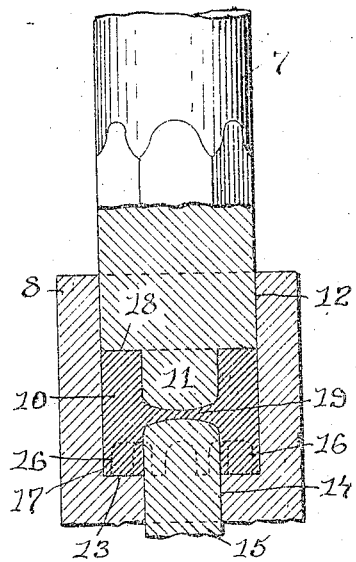
Figure 4 is a sectional view similar to Figure 3 showing the members closed and the nut blank castellated.
Figure 6:
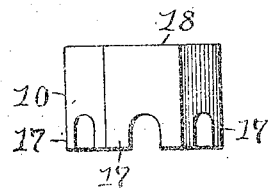

The nut holding and castellating member 8 has a hexagonal shaped cavity 12 the size of the plunger 7 and of the nut to be castellated. The cavity 12 as shown in Figures 2, 3 and 4 has a flat nut bottom 13 in which is a round bore 14 which extends centrally through the bottom 13. A movable stud member 15 having the same size and shape as the stud 11, is movably supported in the bore 14 and extends into the cavity 12, the distance required, when the nut is being castellated. Projecting castellating members 16, 16 are formed on the bottom 13 and on the sides, and surround the bore 14, said projecting castellating members being shaped to form the castellations on the nut. The movable stud member 15 has predetermined reciprocating movements operated by a cam, not shown, or other means. The castellated nut 10 has the castellations 17, 17 and the usual flat bottom 18, as shown in Figure 6.

Figure 5:
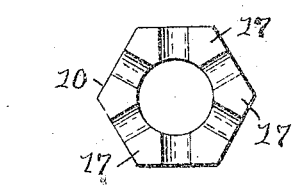
Figures 5 and 6 are top and side views respectively of the castellated nut.

When in use a nut blank 9 is placed in the cavity 12 with the movable stud member 15 protruding into the cavity, as shown in Figure 3. The members 7 and 8 are now brought together under the required pressure, thereby forming the castellations 17, 17 on the nut blank, as shown in Figures 5 and 6, and the studs 11 and 15 simultaneously entering the blank, forms the greater portion of the hole in the blank, leaving a thin transverse web 19, as shown in Figure 4. The members 7 and 8 are now separated and the movable stud member 15 operated against the web 19 to push the castellated nut out of the cavity 12 where it is removed by an air blast or other means. In completing the nut the thin web 19 is punched out and the hole thus formed screw-threaded in the usual way.

As the nut blank now has just the right amount of metal to form the castellations and the greater portion of the hole in the nut, all of the metal heretofore wasted in forming the castellations is saved and the greater portion of the metal heretofore lost in drilling the hole is also saved and by condensing the metal by pressure a more perfect and durable castellated nut is produced.

Having thus described my invention I claim as new:

Means for making castellated nuts comprising a member having a cavity the shape and size of the nut to be castellated, projecting members in said cavity adapted to form castellations on the nut, and a member having a sliding fit in said cavity, whereby on forcing the last mentioned member into said cavity, castellations are formed on the nut by compressing the metal of the nut.

In testimony whereof, I have signed my name to this specification.

FERNANDO OSCAR JAQUES, JR.